UNITED STATES PATENT OFFICE.

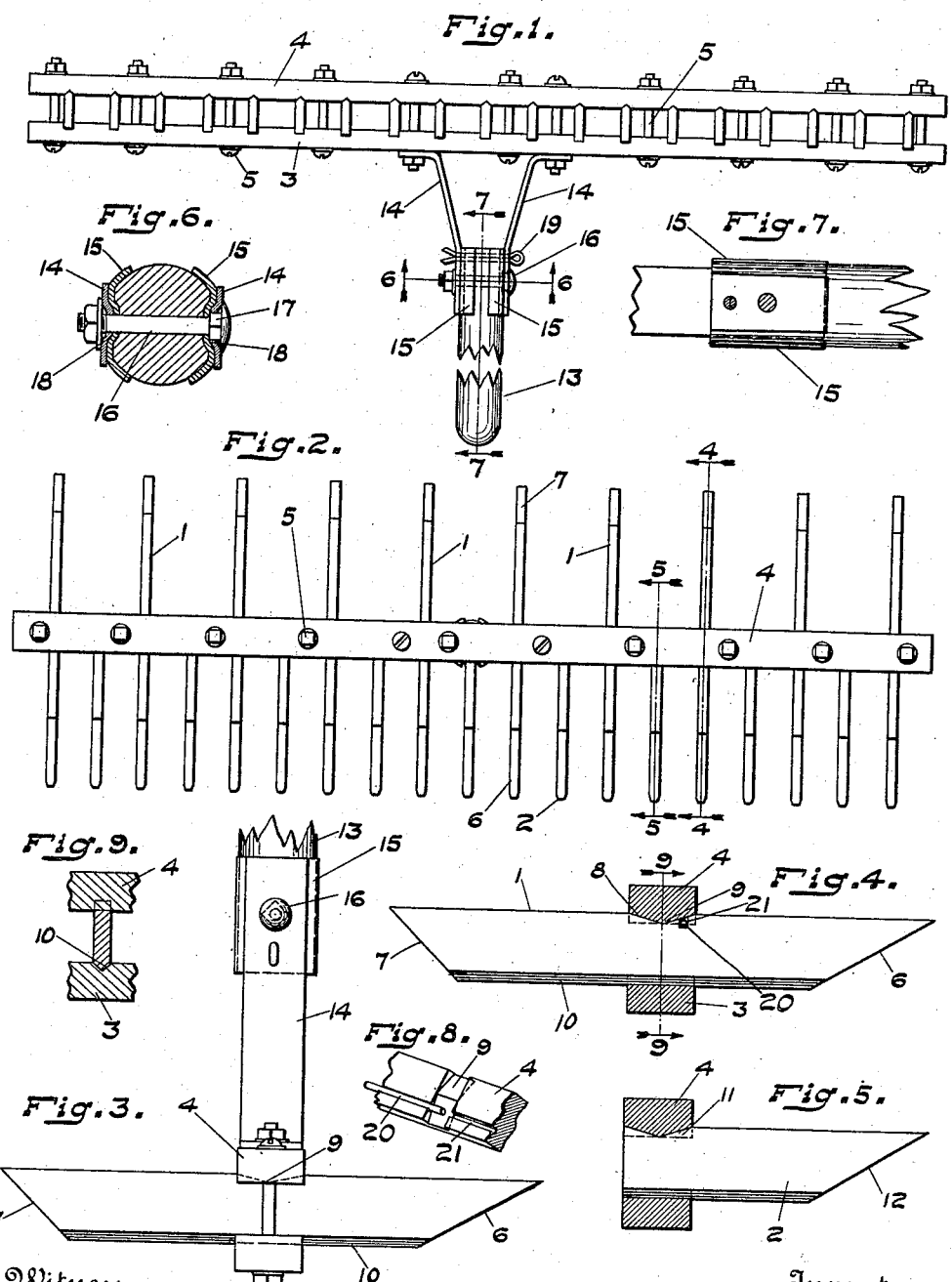

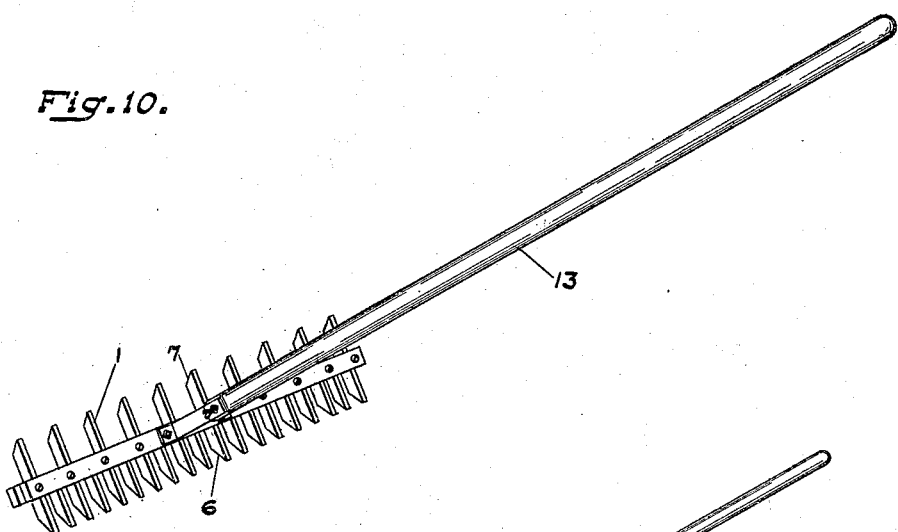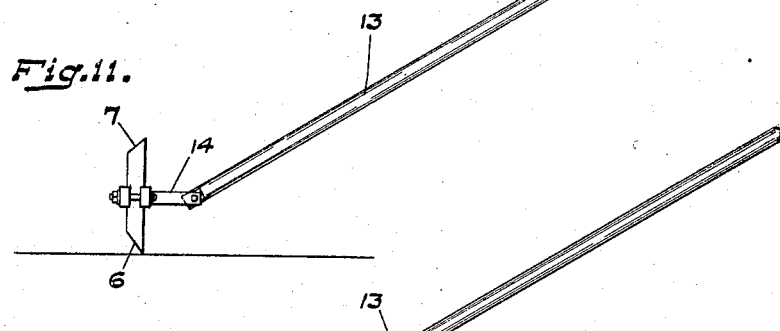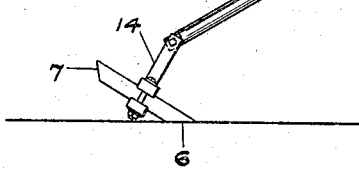

ANDREW J. HINKLE, OF WHITESVILLE, INDIANA.

RAKE.

1,276,915.  Specification of Letters Patent.  Patented Aug. 27, 1918.

Application filed September 23, 1916. Serial No. 121,825.

*To all whom it may concern:*

Be it known that I, ANDREW J. HINKLE, a citizen of the United States, residing at Whitesville, Montgomery county, and State of Indiana, have invented and discovered certain new and useful Improvements in Rakes, of which the following is a specification.

My invention relates to rakes. Its object is to provide an article of this class having means whereby a double headed rake is provided having teeth differently spaced on each side of the head and provided with points of different degrees of sharpness whereby the opposite sides of the rake head may be employed for different purposes, as for example, one side may be used more advantageously for raking leaves and the other side for raking grass, and also one side may be used for stirring and breaking the soil; to provide a rake tooth of a form that is rigid and strong in construction, that is adapted to readily free itself of clogging material and which may be held at such an angle to the ground as to have a flat bearing surface thereon, thereby enabling the rake to be drawn along without piercing the ground, when desired, so as to avoid wear on the rake teeth, and also avoid injury to the grass or other growth covered by the material to be raked; to provide a separable, knock-down construction of the rake whereby the same may be made of different members which may be readily assembled; to provide means for rigidly holding the rake teeth in the clamping head both against longitudinal movement and transverse tilting, one of said constructions providing for this retention being so formed as to also facilitate the assemblage of the bars of the clamping head and the teeth; to provide means for adjusting the head angularly with respect to the handle, whereby the angle of the teeth to the ground may be changed and also whereby the head may be adjusted to such an angle as to present the flat plane surface thereof to the ground for the purpose of enabling the rake to be used as a clod breaker or similar impact tool and to provide means whereby the head and handle may be readily attached and detached should it be necessary to repair or replace the handle.

With these objects in view, my invention is embodied in preferable form in the construction and arrangement hereinafter described and illustrated in the accompanying drawings.

In these drawings, Figure 1 is a top plan view of the rake; Fig. 2, a front view in elevation; Fig. 3, a side view; Fig. 4, a detailed enlarged side view, partly in section, of one of the longer teeth and the clamping bars; Fig. 5, a detailed cross section on the line 5—5 of Fig. 2, showing one of the shorter teeth; Fig. 6, a detail cross section through the handle connecting member on the line 6—6 of Fig. 1; Fig. 7, a detail side view of connecting member and socket; Fig. 8, a detail perspective of the locking rib on the clamping bar, Fig. 9, a detail cross section of the longitudinal ridge, Fig. 10, a rear perspective view of the rake; Fig. 11 a side view in elevation of the rake showing the head adjusted for clod breaking position, and Fig. 12 a similar view showing the head adjusted for raking leaves.

Referring to the drawings, the rake head comprises a series of long teeth 1 and a series of short teeth 2, the latter being mounted on one side of the head alternately between adjacent longer teeth and thereby providing a greater number of teeth, more closely spaced, on one side of the head than on the other, for the purpose of rendering such side of the head better adapted to raking grass and weeds. Both sets of teeth are adapted to be rigidly but detachably clamped by and between two parallel cross bars 3 and 4 which are spaced apart throughout their lengths and which are joined by clamping screw bolts 5, which are arranged at intervals along the bars between the teeth.

The teeth are preferably made of wood and have wide flat side faces and wide flat end faces extending the full width of the teeth. The longitudinal edges of the teeth bear against the opposing bars. This arrangement together with the spacing of the bars and the use of the screw bolts, gives a very strong, truss-like construction to the head, as distinguished from a construction in which the bars would bear against one another so as to form in effect a single piece.

Referring to the construction of one of the longer teeth it will be seen that one end of the same has an acutely inclined or beveled end 6 slanting upwardly from front to rear and which is adapted to provide a flat end face and a comparatively acute point. When it is desired to pull the teeth through the grass or other plants without piercing the soil, the head is adjusted by means hereafter described at such an angle that the flat faces of the ends will rest evenly upon the ground, thus avoiding penetration of the soil and preventing injury to the roots of the grass. When it is desired to present the point of the tooth at such an angle as to penetrate the soil somewhat, the rake head is tilted so as to bring the teeth nearer a right angle to the surface of the ground, whereupon the acutely formed end of the tooth will serve to penetrate the soil and grass more freely.

The other end of the long tooth 1 is also provided with a rearwardly and upwardly inclined beveled end face 7, but the angle thereof is much less acute than that of the face at the other end, the object of which formation is to provide a blunter and stronger end adapted for breaking clods or the surface of the soil and also a flatter end which will serve to effectively split leaves so as to more readily release the same and which ends of the teeth of the rake are therefore particularly adapted for leaf raking. This wide end of the tooth will serve to split from center to circumference any leaf of the usual size.

The bevel ends of the tooth also enable the release of the teeth from leaves, grass or other material tending to clog the rake, to be effected by sliding the rake backward on the flat bearing faces thus provided.

Formed in the front longitudinal edge of each tooth of the longer series is a notch 8 provided by inclined walls meeting in the center and which notch is adapted to engage complementarily formed transverse wedge-shaped saddle portions 9 formed in the cross bar 4 of the head and by means of which interfitting notches and ridges the tooth is adapted to be held against longitudinal movement. Along its rear edge the tooth is provided with a longitudinal wedge shaped rib 10 which is adapted to fit a V-shaped groove formed in the cross bar 3 of the head and which interfitting rib and groove prevent sidewise tilting of the tooth when the latter is clamped between the bars, and also facilitates the engagement of the bar 3 with the tooth when the teeth and the bars are to be assembled, since the V-rib and V-groove easily fit into one another.

Each of the shorter teeth is provided with a V-shaped notch 11 on one of its longitudinal edges which is adapted to engage a correspondingly V-shaped rib in one of the clamping bars of the head. These shorter teeth are also provided on their opposite edges with longitudinal wedge-shaped ribs similar to the ribs 10 of the other teeth. These shorter teeth are provided with raking ends 12, beveled at the same angle as the more acute ends of the longer teeth and as before stated, the shorter teeth are adapted to be placed alternately between the longer teeth on the side of the head from which the acute ends of the latter project.

The handle 13 of the rake is adapted to be secured to the head not only detachably but also adjustably, the latter arrangement being for the purpose of enabling the head to be shifted to any desired angle relatively to the ground or to the handle for the purpose of altering the angle of the teeth to the ground so as to enable, for instance, the beveled ends to be drawn along with a flat bearing surface on the ground without penetration of the soil, all as previously referred to, and also for the purpose of enabling the head to be so adjusted as to present the rear longitudinal edges of the teeth and the rear surface of the outer cross bar, flatwise to the surface of the ground so as to enable the rake to be conveniently pounded against the ground to break up clods or pack fibrous material. To this end, bent metallic arms 14 are detachably secured to the inner cross bar 3 of the head and the inner ends of these arms bear flat against the outer flat surfaces of bent clamping socket members 15 which are adapted to embrace the flattened end of the handle. These socket members serve as bearings for the ends of the detachable arms and as clamping members to surround and engage the handle and also constitute a ferrule for the end of the handle which will prevent the same from splitting.

Passing through the two arms and the socket members and also through an aperture in the handle adjacent the end thereof is a clamping and pivot bolt 16, having near one end thereof a squared portion 17 which engages a squared aperture in one of the arms whereby the bolt is prevented from turning and which bolt is provided with a nut at the other end thereof, whereby the arms and socket members may be tightened against the handle.

Surrounding the bolt apertures in the socket members and arms are annular depressions 18 which serve to carry the bearing point away from the pivot bolt and thus relieve shearing stress on the latter.

When it is desired to use the rake for raking particularly heavy material or for stirring heavy soil, under which conditions a greater strain is imposed on the pivot bolt, a cotter pin 19 is adapted to be passed through apertures in the connecting members, socket and handle, which apertures are located nearer the end of the handle than the pivot bolt, and thereby the rake head is locked against accidental movement around the pivot bolt.

In order to provide an additional or alternative mode of securing the teeth against longitudinal movement, a wire 20 lying in a groove 21 in the bar 4 is provided and which is adapted to engage a notch in the edge of the tooth so as to prevent longitudinal movement of the latter.

It will be seen that by the above construction and arrangement a rake is provided which is very strong and rigid, and durable in construction and which may be employed as a leaf rake, a lawn rake and a garden rake.

Having thus described my invention, what I claim is:

1. A rake having teeth on both sides of the central transverse line of the head whereby the rake may be reversed for use on either side thereof said teeth being of solid construction and having wide surfaces from front to rear thereof, such surfaces being uniform throughout the length of the teeth and having flat, beveled ends extending from front to rear of the teeth said end portions being beveled upwardly and rearwardly and the end at one point of each tooth being more acutely beveled than the other end.

2. A rake having a head comprising separable cross bars, flat wide teeth detachably clamped edgewise between said bars and having their longitudinal edges bearing against the latter, said bars and teeth having interfitting formations adapted to prevent movement of the teeth longitudinally thereof with respect to the bars, and means to hold said teeth against sidewise displacement.

3. A rake having transverse clamping bars and having a tooth adapted to be held between said bars, said tooth provided on one of its longitudinal edges with a notch having inclined walls, a correspondingly shaped recess on one of said bars adapted to engage said notch to prevent longitudinal movement of the tooth, and a V-shaped ridge on the other longitudinal edge of the tooth and a groove in the other bar adapted to engage said V-shaped ridge, to prevent sidewise tilting of the tooth.

4. A rake having a toothed head and having a handle, connecting means between the handle and head, said connecting means comprising arms extending angularly from the head and adapted to bear on opposite sides of the handle, a pivot bolt permitting angular adjustment of the head relatively to the handle and socket and ferrule means between the arms and handle, said arms being movable relatively to the handle around the latter on the pivot bolt to obtain said adjustment.

In witness whereof, I have hereunto set my hand and seal at Indianapolis, Indiana, this 31st day of August, A. D. nineteen hundred and sixteen.

ANDREW J. HINKLE. [L. S.]

Witnesses:
H. P. DOOLITTLE,
A. C. RICE.

Copies of this patent may be obtained for five cents each, by addressing the "Commissioner of Patents, Washington, D. C."